(No Model.)

F. E. DRAKE.
FASTENER FOR SASHES.

No. 437,103. Patented Sept. 23, 1890.

WITNESSES:
J. L. Clark
C. Sedgwick

INVENTOR:
F. E. Drake
BY Munn & Co.
ATTORNEYS

UNITED STATES PATENT OFFICE.

FRANCIS E. DRAKE, OF COLUMBUS, OHIO.

FASTENER FOR SASHES.

SPECIFICATION forming part of Letters Patent No. 437,103, dated September 23, 1890.

Application filed June 27, 1890. Serial No. 356,933. (No model.)

*To all whom it may concern:*

Be it known that I, FRANCIS E. DRAKE, of Columbus, in the county of Franklin and State of Ohio, have invented a new and useful Improvement in Fasteners for Sashes and for other Articles, of which the following is a full, clear, and exact description.

This invention, while applicable to other purposes or uses, is more especially designed for the purpose of holding or fastening together the ends or two parts of an overlapping sash or baldric.

The invention relates to that description of snap-fasteners which consists, essentially, of a notched or grooved stud constituting one part of the fastener, and a tube or socket provided with a locking-spring for the stud constituting the other part of the fastener, and so that when the stud is entered within the tube or socket the spring will snap into engagement with it to hold the parts together against lateral or all ordinary strain tending to displace or disconnect them, but so that the fastener may be quickly and readily engaged and disengaged by force applied in direction of the length of the stud or axial line of the socket to snap the stud into lock with the spring or to make the stud slip the spring by the yielding of the latter; and the invention comprises a combination, with the tube or socket and grooved stud, of a peculiarly-constructed spiral spring arranged within the socket for engagement with and disengagement from the stud, substantially as hereinafter described, and more particularly pointed out in the claims.

Reference is to be had to the accompanying drawings, forming a part of this specification, in which similar letters of reference indicate corresponding parts in all the figures.

Figure 1:
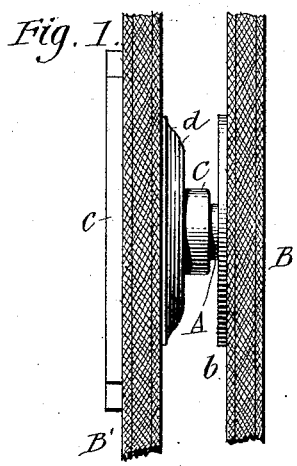
Figure 2:
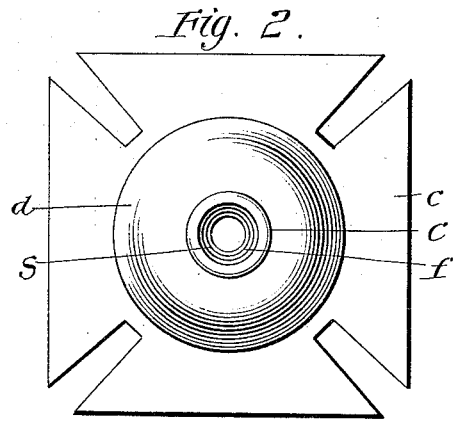
Figure 3:
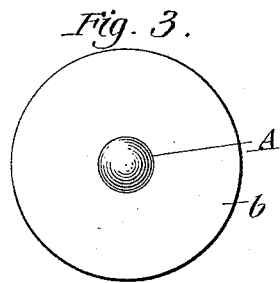
Figure 4:
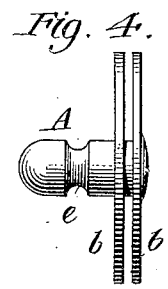
Figure 5:
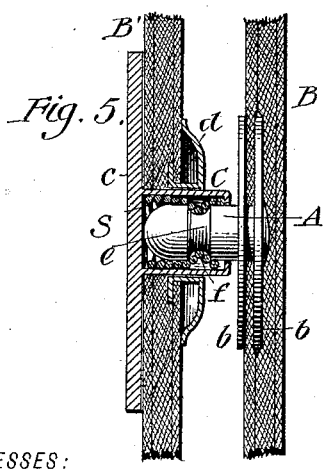
Figure 6:
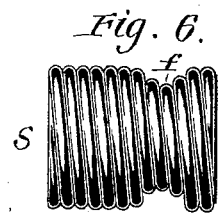

Figure 1 represents a side view of the ends or overlapping portions of a baldric with the fastener applied and as engaged or in lock. Fig. 2 is an inner face view of the tube or socket portion of the fastener and plates carrying the same, also showing the spiral spring within the socket. Fig. 3 is an end view of the stud portion of the fastener with its securing-plates, and Fig. 4 is a side view of the same. Fig. 5 is a mainly sectional view of the parts as illustrated in Fig. 1; and Fig. 6, a longitudinal view, upon an enlarged scale, of the spring used in the socket portion of the fastener.

A is the stud secured, as by plates $b$ $b$ or otherwise, to the one portion B of the scarf or baldric, and C the tube or socket carried by a face-plate $c$ of any suitable shape and pattern and guide-plate $d$, or otherwise secured to the other portion B' of the scarf or baldric, or whatever the fastener is applied to.

The stud A is formed with an annular groove $e$ in it near its outer end, and the tube or socket C is fitted with a spiral spring S, mainly of an internal diameter corresponding with the exterior diameter of the body of the stud, but contracted in size or diameter at a point intermediately of its length, as at $f$. This spring may be made by coiling the wire of which it is made upon a mandrel of like diameter with the stud and having a groove in it similar to that in the stud. When such spring is in its place within the socket C and the exposed end of the latter bent over to hold it in place, the stud may be pressed into the socket within the spring therein, in doing which the portion of the stud in front of the notch or groove $e$ will expand or enlarge the contracted spiral portion $f$ of the spring until the groove $e$ comes opposite said portion $f$, which then will snap into lock with the grooved portion $e$ of the stud. This engages the fastener. To disengage it, all that is necessary is to pull on the stud or socket to separate them, when the stud will slip, the spring by its enlarged portion in passing causing the contracted portion $f$ of the spring to yield or become expanded. By thus using a spiral locking-spring of irregular diameter, as described, instead of a split ring or other form of spring having a contracted range of action the permanent elasticity of the spring is better secured, every coil in the spring throughout its whole length being called into action as the stud is made to engage and disengage, the action is gradual as the enlarged portion of the stud attempts to pass the contracted portion of the spring, and the whole spring may be made to hug the stud throughout its length, thus adding to the hold of the fastener when engaged. The entire fastener, too, is of exceedingly simple construction.

Having thus described my invention, what I claim as new, and desire to secure by Letters Patent, is—

1. The herein-described fastener, consisting in the tube or socket C, the spiral spring S therein, of approximately the same length as said tube, the said spring having certain of its coils between its ends contracted, as shown at $f$, and the stud A, having an annular groove $e$, to receive the said contracted portion $f$, substantially as described.

2. The herein-described fastener, consisting in the tube C, provided with a back plate $c$ at its closed end, an inward-projecting flange at its open end, a spiral spring S, held in the tube by said flange and having certain of its coils between its ends contracted, as shown at $f$, the apertured face-plate $d$, fitting on said tube, the stud A, having an annular groove $e$, to receive the part $f$ of the spring and provided with the two attaching-plates $b\ b$, substantially as described.

FRANCIS E. DRAKE.

Witnesses:
PHILIP LINDENBERG,
WILLIAM SCARLETT.